Nov. 28, 1961   R. J. BARTUS   3,010,349
WORK DRIVER
Filed March 17, 1958   2 Sheets-Sheet 1
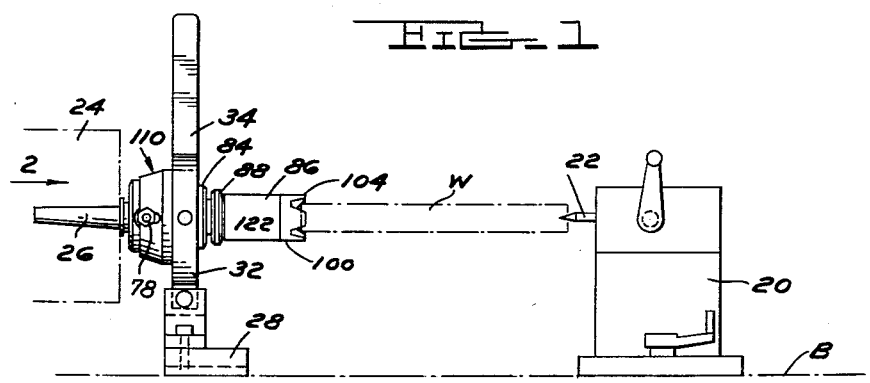
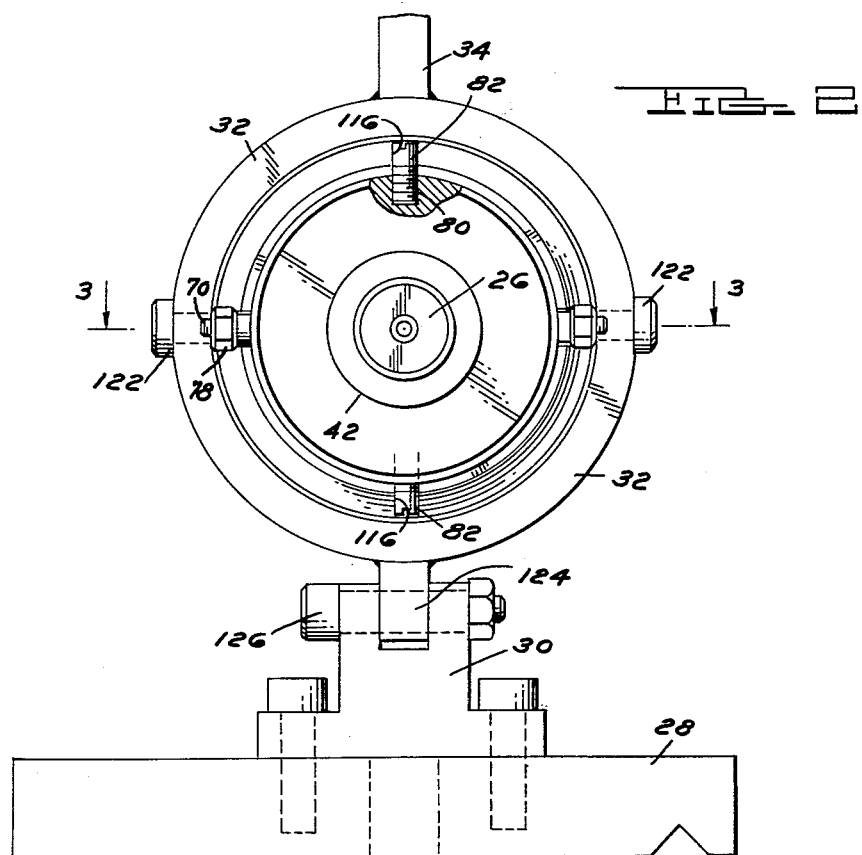
INVENTOR.
RAYMOND J. BARTUS
BY
Barnes, Kisselle, Raisch & Choate
ATTORNEYS Nov. 28, 1961   R. J. BARTUS   3,010,349
WORK DRIVER
Filed March 17, 1958   2 Sheets-Sheet 2
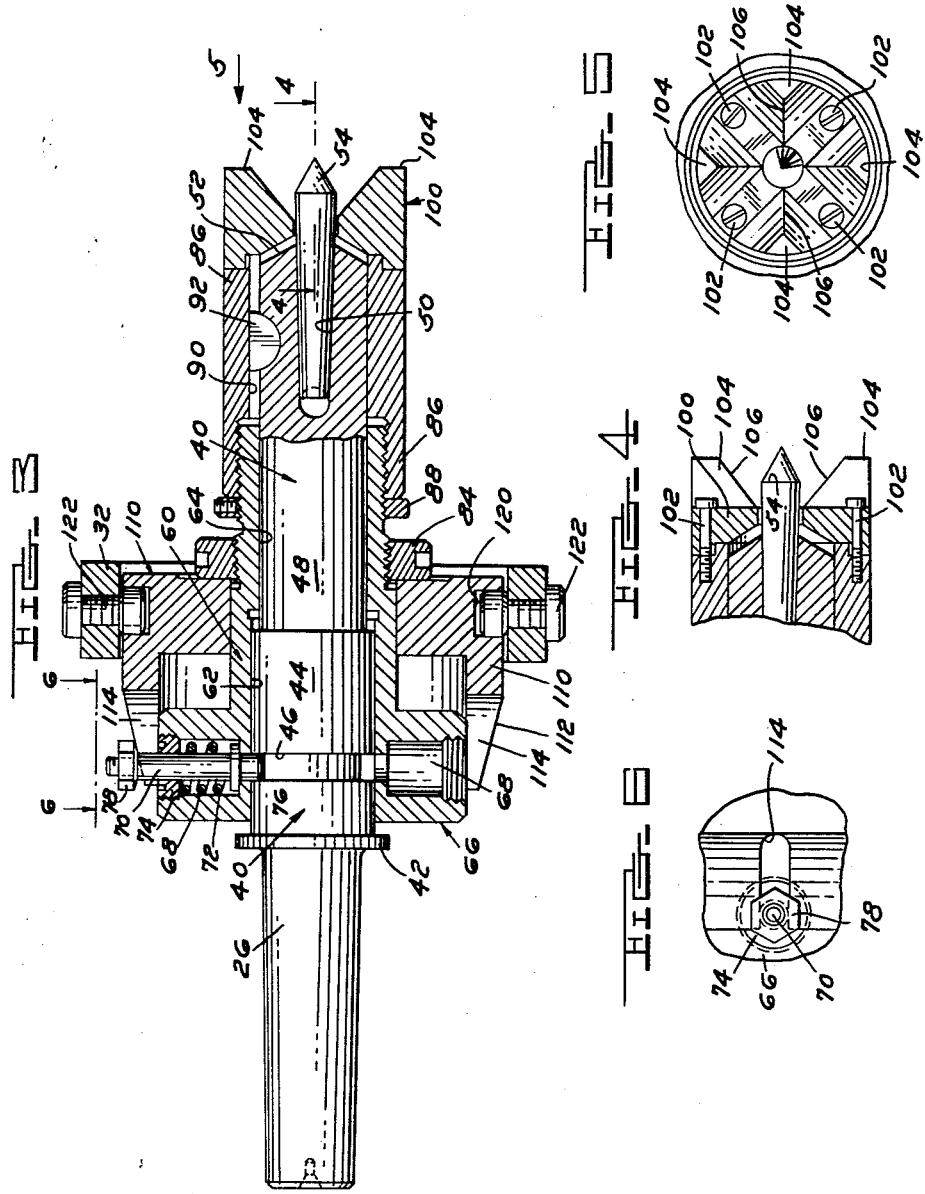
INVENTOR.
RAYMOND J. BARTUS
BY
Barnes, Kisselle, Raisch & Choate
ATTORNEYS

United States Patent Office 3,010,349
Patented Nov. 28, 1961

3,010,349
WORK DRIVER
Raymond J. Bartus, Birmingham, Mich., assignor to Detroit Reamer & Tool Co., Birmingham, Mich., a corporation of Michigan
Filed Mar. 17, 1958, Ser. No. 721,930
5 Claims. (Cl. 82—40)

This application relates to a drive mechanism for work pieces which are to be held in machines for rotation during a cutting operation or some similar work. It is particularly useful for small slender round parts which are to be ground or turned or milled or treated in some other way in a lathe or grinding machine.

It is an object of the present invention to provide a mounting device which centers the part prior to the application of the driving mechanism which will turn it in the machine.

It is an object of the invention to keep a part perfectly centered in the turning operation regardless of the drive application. In the past, it has been common to use "lathe dogs" which apply the drive force to the part unevenly and sometimes tend to apply a bending moment to the part as well as a torque. The present device applies an even torque with no bending force and permits very rapid interchange of parts in a machine while maintaining accurate positioning.

Other objects and features of the invention will be apparent in the following description and claims.

Drawings accompany the disclosure and the various views thereof may be briefly described as:

FIGURE 1, a view of an assembly unit showing the relationship to the parts of a machine such as a lathe.

FIGURE 2, an elevation on line 2 of FIGURE 1.

FIGURE 3, a sectional view on line 3—3 of FIGURE 2.

FIGURE 4, a sectional view on line 4—4 of FIGURE 3.

FIGURE 5, an end view on line 5 of FIGURE 3.

FIGURE 6, a partial plan view at line 6—6 of FIGURE 3.

Referring to the drawings, a lathe bed B has a tail stock 20 with a standard center 22. A drive spindle 24 receives a Morse taper end 26 on a drive unit which is supported over a bracket 28 mounted on the lathe bed, said bracket having a bifurcate part 30 for mounting an operation trunnion ring 32 having a handle 34.

Referring to FIGURE 3, the Morse taper end 26 is part of a main center shaft 40 which has a flange 42 and a cylindrical portion 44 grooved at 46. The cylindrical portion 44 reduces to a portion 48 which is provided with a tapered recess 50 in a nose portion 52 to receive a tapered shank of a centering insert 54. These parts on the shaft 40 are all rigidly mounted to rotate with the spindle 24.

Surrounding the shaft 40 is a body unit 60 comprising a sleeve portion slidably receiving in bore 62, the portion 44 of shaft 40, and in bore 64, the portion 48 of shaft 40. This body 60 has a head portion 66 which is provided with diametrically opposed holes 68. In these holes 68 are mounted plungers 70 urged inwardly by a spring 72 which is retained by a threaded collar 74. The inner end of the plunger 70 has a nose portion 76 for cooperation with the groove 46. The outer end of the plunger is threaded to receive a nut 78 which serves a function which will be later described.

Spaced 90° from the holes 68 in the head 66 (FIGURE 2) are diametrically opposed holes 80 which receive studs 82, the function of which will be later described.

The forward end of the sleeve portion of the body 60 at the end opposite the head 66 is provided with two threaded portions, the first of which has mounted thereon a ring 84 locked in position on the threads. The second threaded portion has mounted thereon an extension sleeve 86 and an adjustment ring 88 for positioning and locking the sleeve 86 on the sleeve 60. The extension sleeve 86 is provided with a key slot 90 which cooperates with a key 92 in shaft 40. The entire sleeve portion 60 thus will slide axially relative to the shaft 40 but will rotate with it because of the key 92. The rearward motion of the sleeve 60 will be controlled by the flange 42 and the forward motion will be limited by the pins 76.

On the work end of the sleeve extension 86 is mounted contact ring 100 held in place by bolts 102. This ring has nose portions 104 which have sharp leading edges 106 for engaging a round work piece as shown in FIGURE 1. The ring 100 is thus mounted concentrically with the center 54 and slidable in relation to it.

The actuating means for the work holding or torque transferring means is a ring body 110 having a tapered portion 112 at the rear side provided with opposed slots 114 for cooperating with the plunger pins 70 and the nuts 78. The pins are received in the slots and the tapered portion of the ring body 110 serves as a cam moving the pins radially outward when the body 110 is moved back. Ninety degrees spaced from the slots 114 are other slots 116 for cooperating with pins 82. The ring body 110 is also provided at the forward portion with an outer groove 120, which cooperates with the actuating means 32. Trunnion bolts 122 pass through the ring 32 into the groove 120. The ring 32 has a perforated radial stud 124 which is mounted on the bifurcate bracket 30 by a bolt 126. Thus a swinging of the handle 34 around the pivot 126 will cause a rearward and forward movement of the ring body 110 while it is rotating with the sleeve body 60 and the shaft 40.

In the operation of the device, as it is shown in FIGURE 1, a work piece W is placed between center 22 and center 54 in the usual manner by moving the tail stock center 22 into position.

The work part at this stage is free to rotate on the centers. During this time, the handle 34 has been moved to the left as viewed in FIGURE 1 to back off the ring 100, this being accomplished by the camming up of the nuts 78 and the plunger pins 70 so that the entire sleeve body 60 can be moved rearwardly to the flange 42. After the work piece is mounted in position, the handle 34 is moved to the right, as viewed in FIGURE 1, carrying the ring body 110 forward till it contacts the positioning ring 84. This permits also the plungers 76 to enter the groove 46 locking the sleeve body 60 in its forward position. At the same time that the sleeve body 60 is being moved to the right, the driving edges 106 of the ring 100 will be engaging the end of the work piece W which is already mounted on the center 54.

Thus a driving force on the spindle will be transmitted to the work. When the machining operation is accomplished and a work piece is to be replaced, the handle 34 can be moved to the left and a new part W inserted without even stopping the spindle. The work part can then be engaged again by the nose ring 100 and another work operation performed. A very rapid change of parts is thus accomplished without the necessity of attaching a lathe dog or any other member to the part and it is also true that a positive drive which is a pure torque force is applied to the work. With this arrangement it is always assured that the work will be accurately centered and it becomes unnecessary to square up the ends of these work pieces to insure centering. The use of the device in a shop can save a great deal of the operator's time and increase his production materially over previous work devices as well as increase the accuracy of the machine by reason of the accurate centering and the lack of bending forces on the work piece.

I claim:
1. A work holding and driving device to be interposed between a spindle and tail stock of a work rotating machine which comprises a center shaft having a center for the work piece mounted to be driven by a spindle, work engaging means radially fixed and axially slidable relative to and mounted directly adjacent said center on said center shaft for directly engaging the work piece, locking means rotatable with the center shaft shiftable radially to lock the work engaging means axially relative to said shaft in a work engaging position, and means mounted adjacent said locking means movable axially to consecutively unlock said work engaging means and then disengage it from the work while the center shaft is still rotating.

2. A work holding and driving device to be interposed between a spindle and tail stock of a work rotating machine which comprises a center shaft having a center for a work piece mounted to be rotated by a spindle, work driving means comprising a sleeve radially fixed and axially slidable relative to and directly adjacent said center shaft for directly engaging the work piece, locking means comprising plungers rotatable with the center shaft shiftable radially to lock the work-engaging means axially relative to said center shaft in a work engaging position, ring means movable axially to consecutively unlock said work engaging means and then disengage it from the work while the center shaft is still rotating comprising a ring body positioned around said center shaft having a cam portion for disengaging said locking means for the work engaging means and an abutment to contact spaced portions of said sleeve to shift it selectively in one direction or another, and a non-rotating handle operatively connected to said ring body for shifting said ring body regardless of whether it is stationary or rotated.

3. A device as defined in claim 2 in which an adjustable extension is provided on said work engaging means for regulating the degree of engagement of said work when said ring body shifts said sleeve to locked position.

4. A work holding and driving device to be interposed between a spindle and tail stock of a work rotating machine which comprises a center for the workpiece consisting of a shaft driven by a spindle having a locating center at one end, a work engaging means comprising a sleeve portion axially slidable on said shaft for directly engaging the work piece, locking means for said shaft for locking the sleeve in a work engaging position relative to said shaft comprising a plunger in said sleeve radially movable to cause relative engagement between said shaft and said sleeve and a means for releasing said locking means comprising an axially shiftable ring body surrounding said sleeve having a cam portion for engaging said plunger to move said plunger radially to a releasing position upon axial shifting of said ring body.

5. A work holding and driving device to be interposed between a spindle and tail stock of a work rotating machine which comprises a center for the work piece consisting of a shaft driven by a spindle having a locating center at one end, a sleeve on said shaft having on one end surrounding said center axially projecting sharp nose portions for directly engaging a work piece when moved axially into contact with said work piece, and having at the other end a locking means to lock said sleeve axially relative to said shaft, said locking means comprising one or more plungers projecting radially from said sleeve selectively into an annular groove in said shaft, said plungers having a head portion extending outside said sleeve, and a ring body to serve selectively as a lock releasing means and an actuator for said sleeve comprising a ring slidably mounted on said sleeve having a slotted tapered portion extending toward said plungers to interengage the heads of said plungers to shift said plungers outwardly when said ring is shifted axially relative to said sleeve, and radially extending abutment means on said sleeve and said ring body to cause projection and retraction of said sleeve upon actuation of said ring body.

References Cited in the file of this patent

UNITED STATES PATENTS

| | | |
|---|---|---|
| 262,869 | Wertheim | Aug. 15, 1882 |
| 1,133,064 | Schellenbach | Mar. 23, 1915 |
| 1,595,205 | McClain | Aug. 10, 1926 |
| 1,767,836 | Davis | June 24, 1930 |
| 2,545,852 | Kurzweil | Mar. 20, 1951 |
| 2,653,503 | Cormier | Sept. 29, 1953 |

FOREIGN PATENTS

| | | |
|---|---|---|
| 42,785 | Austria | Jan. 1, 1910 |
| 100,805 | Germany | Mar. 17, 1898 |
| 900,166 | Germany | Dec. 21, 1953 |
| 476,515 | Italy | Dec. 15, 1952 |